Dec. 3, 1963 G. E. COLE ETAL 3,112,936
SHIFTABLE FIFTH WHEEL STRUCTURE
Filed Dec. 6, 1961 2 Sheets-Sheet 1

INVENTORS.
Gordon E. Cole and
John A. Kent
By: Walter L. Schlegel, Jr.
Atty.

Witness:
C H Bassett

Dec. 3, 1963  G. E. COLE ETAL  3,112,936
SHIFTABLE FIFTH WHEEL STRUCTURE
Filed Dec. 6, 1961  2 Sheets-Sheet 2
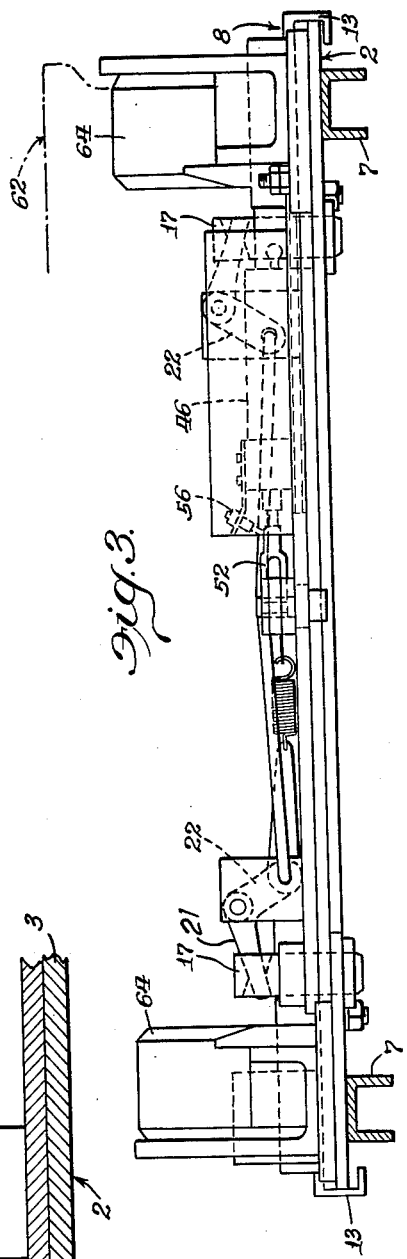
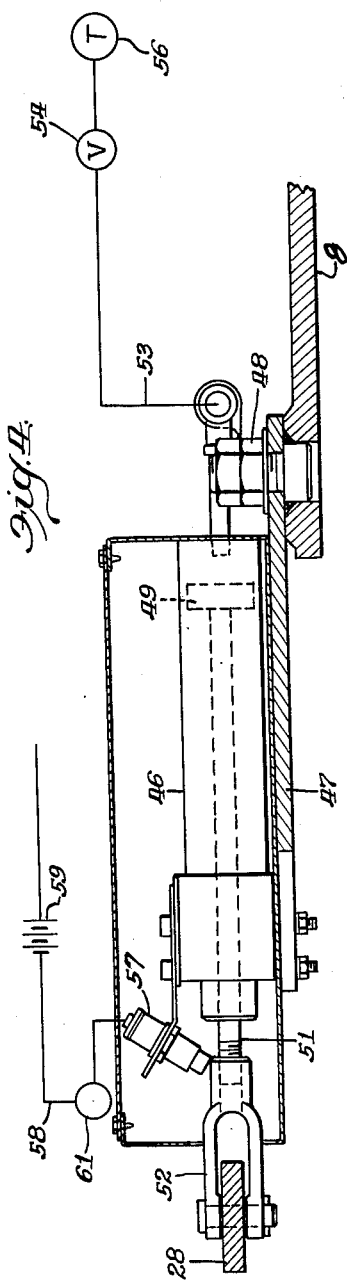
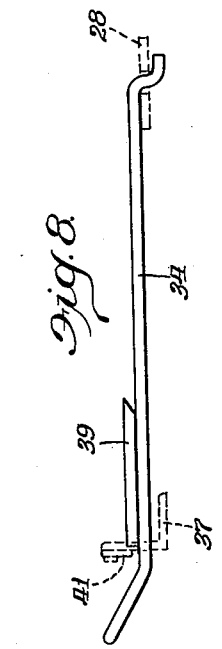
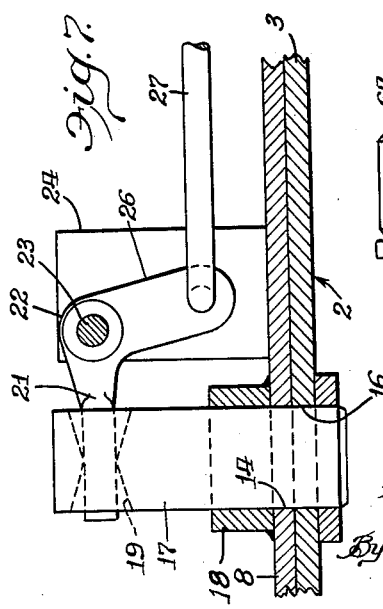
INVENTORS.
Gordon E. Cole
John A. Kent
By Walter J. Schlegel Jr.
Atty.
Witness:
C H Bassett United States Patent Office 3,112,936
Patented Dec. 3, 1963

3,112,936
SHIFTABLE FIFTH WHEEL STRUCTURE
Gordon Estes Cole, Hazelcrest, Ill., and John Alian Kent, Chesterton, Ind., assignors to Amsted Industries Incorporated, Chicago, Ill., a corporation of New Jersey
Filed Dec. 6, 1961, Ser. No. 157,370
7 Claims. (Cl. 280—407)

This invention relates to fifth wheel structures adapted for use on highway tractors for detachable engagement with trailer kingpins.

Briefly, the present invention contemplates the provision of a fifth wheel structure comprising side rails adapted to be secured in fixed position upon the side frame members of a tractor chassis. A saddle is slidably mounted on the side rails for movement to selected positions longitudinally of the tractor, the saddle being secured in selected positions by means of lock pins mounted on the saddle for engagement in spaced apertures formed in the side rails. A conventional fifth wheel device is mounted on the saddle for detachable engagement with a trailer kingpin.

An object of the invention resides in the provision of a fifth wheel structure embodying common means for actuating the lock pins between locked and lock set positions when the structure is moved to a new selected position.

Another object of the invention resides in the provision of a fifth wheel structure embodying resilient means for yieldably resisting movement of the lock pins from their locked position to their lockset position.

A further object of the invention resides in the provision of manually operable means for actuating the lock pins to permit movement of the fifth wheel device longitudinally of the tractor to a new selected position.

Another object of the invention resides in the provision of power means to actuate the lock pins to permit movement of the saddle relative to the side rails.

Another object is to provide a safety latch means to hold the lock pins in their locked position.

The invention embodies other novel features, details of construction and arrangement of parts which are hereinafter set forth in the specification and claims and illustrated in the accompanying drawings, forming part thereof, wherein;

FIGURE 3 is an end elevation of the structure;

FIGURE 4 is a section taken along the line 4—4 of FIGURE 1;

FIGURE 7 is a section taken along the line 7—7 of FIGURE 1;

FIGURE 8 is a detail side elevation showing the operating handle.

Figure 1:
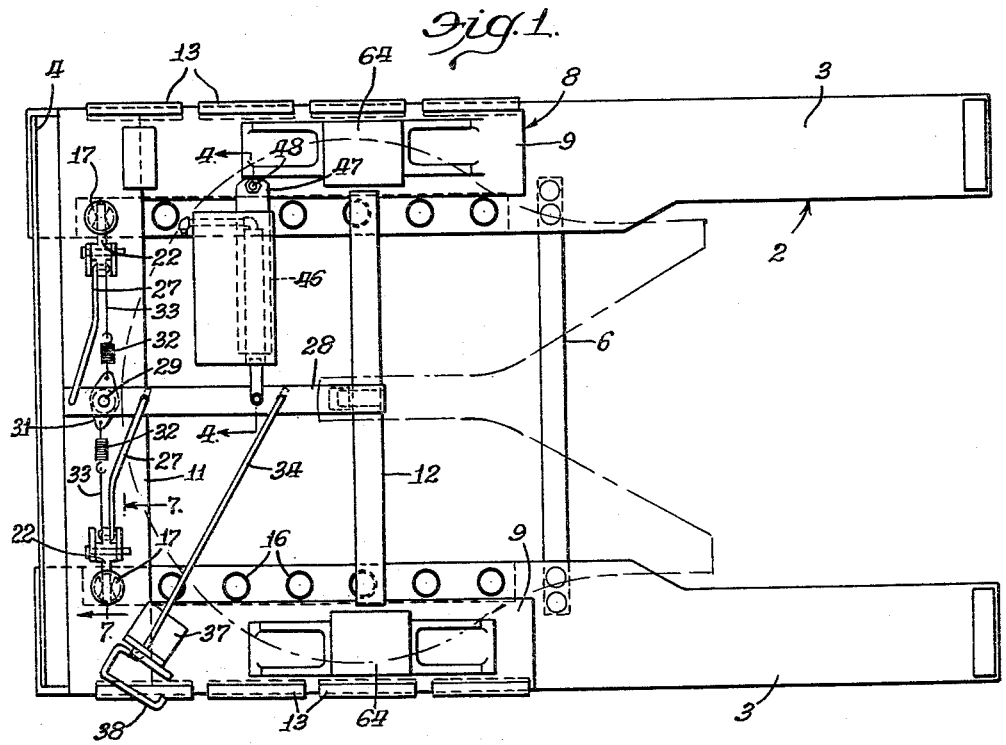
FIGURE 1 is a top plan view illustrating a fifth wheel structure embodying features of the invention, the fifth wheel being shown in phantom outline.
Figure 2:
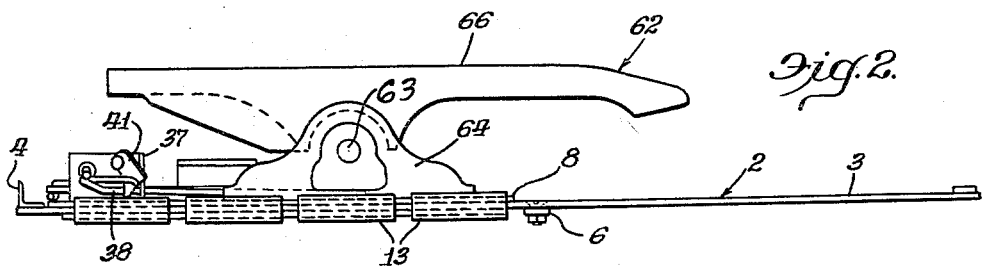
FIGURE 2 is a side elevation of the fifth wheel structure.

Referring now to the drawings for a better understanding of the invention, the fifth wheel structure is shown as comprising a base 2 having side rails 3—3 interconnected by front and rear tie bars 4 and 6. The side rails are adapted to be secured in fixed position upon the side frame members 7—7 of a tractor chassis by means of mechanical or weld connections.

A saddle 8 is slidably mounted on the base 2 for movement longitudinally of the tractor and is shown as comprising side members 9—9 interconnected by front and rear transverse members 11 and 12. Guide members 13 of hook section are welded to or formed integral with the side members 9—9 to receive and slidably engage the outer edge portions of the side rails 3—3. Circular openings 14, formed in the saddle 8 for selective registry with a series of apertures 16 formed in the side rails 3, are provided to receive lock pins 17—17 guided for vertical movement in cylindrical bushings 18—18 welded to the saddle.

The upper ends of the lock pins 17—17 are formed with slots 19 to receive arms 21—21 of their respective bell crank levers 22—22. The levers are journaled on pivot pins 23 mounted in plates 24 welded to the saddle. The other arms 26—26 of the bell crank levers 22—22 are connected by means of links 27—27 to an operating lever 28 pivotally mounted on the saddle by means of a pivot pin 29, the links engaging the lever at opposite side of the pivot pin.

Figure 5:
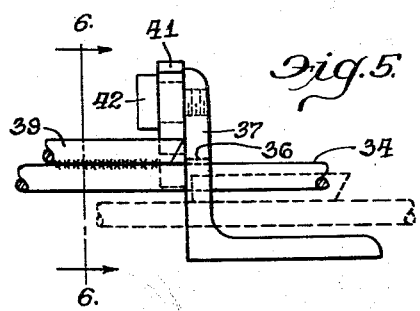
FIGURE 5 is a fragmentary view illustrating the safety latch means.
Figure 6:
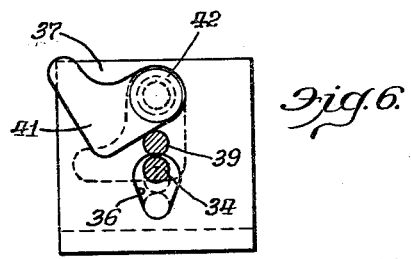
FIGURE 6 is a section taken along the line 6—6 of FIGURE 5.

A spring anchor plate 31 is mounted on the pivot pin 29 for engagement by tension springs 32—32 connected to the arms 26—26 of the bell crank levers 22—22 by means of links 33—33. The free end of the operating lever 28 is connected to a manual operating rod 34 which extends through a slot 36 in a bracket 37 welded to the saddle, the outer end of the rod being formed to provide a handle portion 38. As shown in FIGURES 5 and 6, a stop member 39 comprising a length of rod stock is welded to the operating rod 34 for engagement against the bracket 37 for lock-set position.

A power cylinder 46 is secured to a support 47 pivotally connected by means of a bolt 48 to the saddle 8. A piston 49, mounted in the cylinder, is connected to a piston rod 51 having a clevis 52 secured thereon for pivotal engagement with the operating lever 28. A conduit 53 leads from the cylinder to a control valve 54 and thence to a tank 56 containing fluid under pressure.

A switch 57, mounted on the cylinder, is interposed in a circuit 58 leading from a battery 59 to a red light bulb 61 mounted in the cab of the tractor to warn the operator when the lock pins 17 are in their lock-set position.

A fifth wheel assembly 62 of conventional construction is pivotally mounted at 63 on bearing brackets 64 secured to the saddle 8. The fifth wheel assembly comprises the usual mounting plate 66 formed with a slot to receive a trailer king pin, and means for locking the king pin to the mounting plate.

To adjust the position of the fifth wheel assembly 62 longitudinally of the tractor, the lock pins 17 must first be raised from their locked position in the apertures 16 in the base 2. To raise the lock pins, the latch 41 is first pivoted in a clockwise direction as seen in FIGURE 6 from its locked position shown in FIGURE 8. The operating lever 28 is then pivoted by either the manual operating rod 34 or the power cylinder 46 to act through the links 27 and levers 22 to raise the lock pins which are then held in their raised or lock-set positions by raising the operating rod 34 into position to engage the stop member 39 against the bracket 37, as illustrated in FIGURES 5 and 6. The saddle 8 is then free to be manually moved longitudinally to an adjusted position relative to the tractor. The saddle is then secured in the adjusted position by moving the operating end 34 downward to disengage the stop 39 from bracket 37 to permit the lock pins to be lowered into their selected apertures.

We claim:
1. In a fifth wheel structure, a base having side rails adapted to be secured to side frame members of a tractor and provided with parallel rows of apertures, a saddle slidably mounted for movement along said side rails, lock pins mounted on said saddle for engagement in selected apertures in said side rails, means operable to move said lock pins into and out of said apertures, and a latch mounted on said saddle to engage said means against accidental movement, said means comprising an operating lever pivotally mounted on said saddle, bell crank levers on said saddle engaging said lock pins, links interconnecting said operating lever and respective bell crank levers, and a manual operating rod connected to said operating lever and engageable by said latch to prevent accidental movement of said lock pins.

2. In a fifth wheel structure, a base having side rails adapted to be secured to side frame members of a tractor and provided with parallel rows of apertures, a saddle slidably mounted for movement along said side rails, lock pins mounted on said saddle for engagement in selected apertures in said side rails, means operable to move said lock pins into and out of said apertures, and a latch mounted on said saddle to engage said means against accidental movement, said means comprising an operating lever pivotally mounted on said saddle, bell crank levers on said saddle engaging said lock pins, links interconnecting said operating lever and respective bell crank levers, and a manual operating rod connected to said operating lever and engageable by said latch to prevent accidental movement of said lock pins, and power means to actuate said operating lever.

3. In a fifth wheel structure, a base having side rails adapted to be secured to side frame members of a tractor and provided with parallel rows of apertures, a saddle slidably mounted for movement along said side rails, lock pins mounted on said saddle for engagement in selected apertures in said side rails, means operable to move said lock pins into and out of said apertures, and a latch mounted on said saddle to engage said means against accidental movement, said means comprising an operating lever pivotally mounted on said saddle, bell crank levers on said saddle engaging said lock pins, links interconnecting said operating lever and respective bell crank levers, and a manual operating rod connected to said operating lever and engageable by said latch to prevent accidental movement of said lock pins, and power means to actuate said operating lever, and resilient means to yieldably resist movement of said locking pins out of said apertures.

4. In a fifth wheel structure, a base having side rails adapted to be secured to side frame members of a tractor and provided with parallel rows of apertures, a saddle slidably mounted for movement along said side rails and formed with openings for selective registry with said apertures, lock pins mounted for vertical reciprocative movement in the openings in said saddle for engagement in selected apertures in said side rails, common means on said saddle operable to simultaneously move said lock pins into and out of said apertures, means including a latch mounted on said saddle to alternately secure said lock pin operating means in locked and lock-set positions, said lock pin operating means comprising manual operating rod mounted for reciprocative movement on said saddle, and a stop member on said rod engageable by said latch.

5. In a fifth wheel structure, a flat base having side rails adapted to be secured to side frame members of a tractor and provided with parallel rows of apertures, a flat saddle slidably mounted for movement along said side rails and formed with openings for selective registry with said apertures, lock pins mounted for vertical reciprocative movement in the openings in said saddle for engagement in selected apertures in said side rails, common means on said saddle operable to simultaneously move said lock into and out of said apertures, and a gravity actuated latch pivotally mounted on said saddle to engage said means to prevent against accidental movement of said lock pins from said apertures, said means comprising a manually operable mechanical linkage arrangement mounted on said saddle to actuate said lock pins.

6. In a fifth wheel structure, a flat base having side rails adapted to be secured to side frame members of a tractor and provided with parallel rows of apertures, a flat saddle slidably mounted for movement along said side rails and formed with openings for selective registry with said apertures, lock pins mounted for vertical reciprocative movement in the openings in said saddle for engagement in selected apertures in said side rails, common means on said saddle operable to simultaneously move said lock into and out of said apertures, a gravity actuated latch pivotally mounted on said saddle to engage said means to prevent against accidental movement of said lock pins from said apertures, said means comprising a manually operable mechanical linkage arrangement mounted on said saddle to actuate said lock pins, and resilient means to yieldably resist movement of said lock pins out of said apertures.

7. In a fifth wheel structure, a base having side rails adapted to be secured to side frame members of a tractor and provided with parallel rows of apertures, a saddle slidably mounted for movement along said side rails and formed with openings for selective registry with said apertures, lock pins mounted for vertical reciprocative movement in the openings in said saddle for engagement in selected apertures in said side rails, means comprising an operating lever pivotally mounted on the saddle operable to move said lock pins into and out of said apertures, means including a latch mounted on said saddle to alternately secure said lever in locked and lock-set positions, and power means mounted on said saddle to actuate said lever.

References Cited in the file of this patent

UNITED STATES PATENTS

| | | |
|---|---|---|
| 2,755,104 | Braunberger | July 17, 1956 |
| 2,818,272 | De Lay | Dec. 31, 1957 |
| 2,860,891 | Ramun | Nov. 18, 1958 |
| 2,861,818 | Kayler et al. | Nov. 25, 1958 |
| 2,868,560 | Perry | Jan. 13, 1959 |
| 2,889,154 | De Lay | June 2, 1959 |
| 2,940,774 | Buvelot | June 14, 1960 |